A. U. CRAIG.
CUSHION SUPPORT FOR VEHICLES.
APPLICATION FILED JAN. 22, 1917.
1,258,748.
Patented Mar. 12, 1918.
2 SHEETS—SHEET 1.
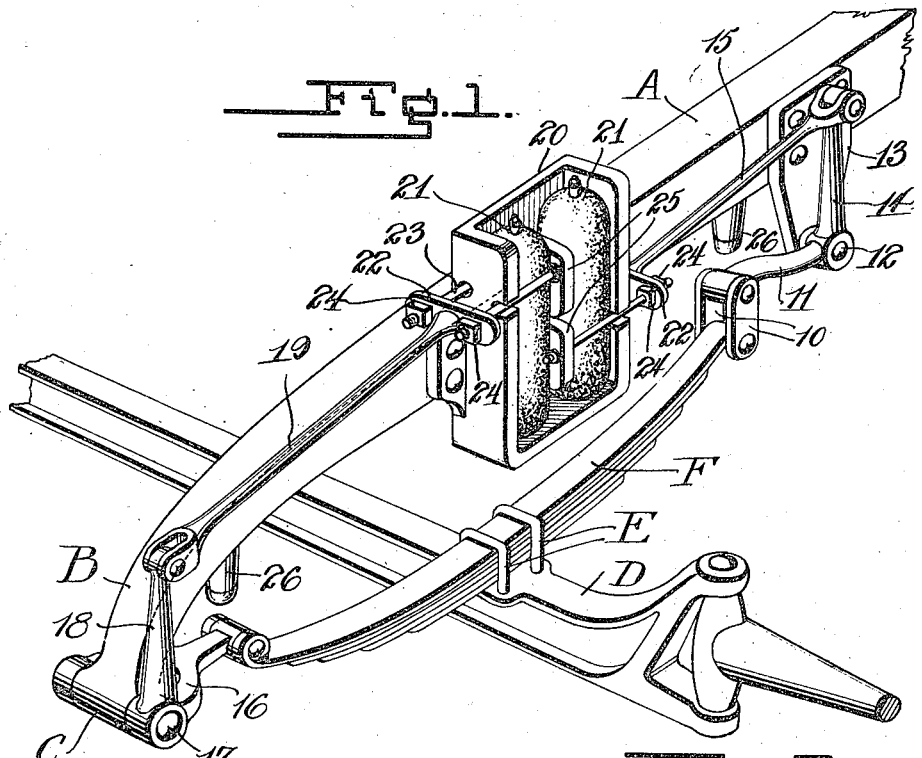
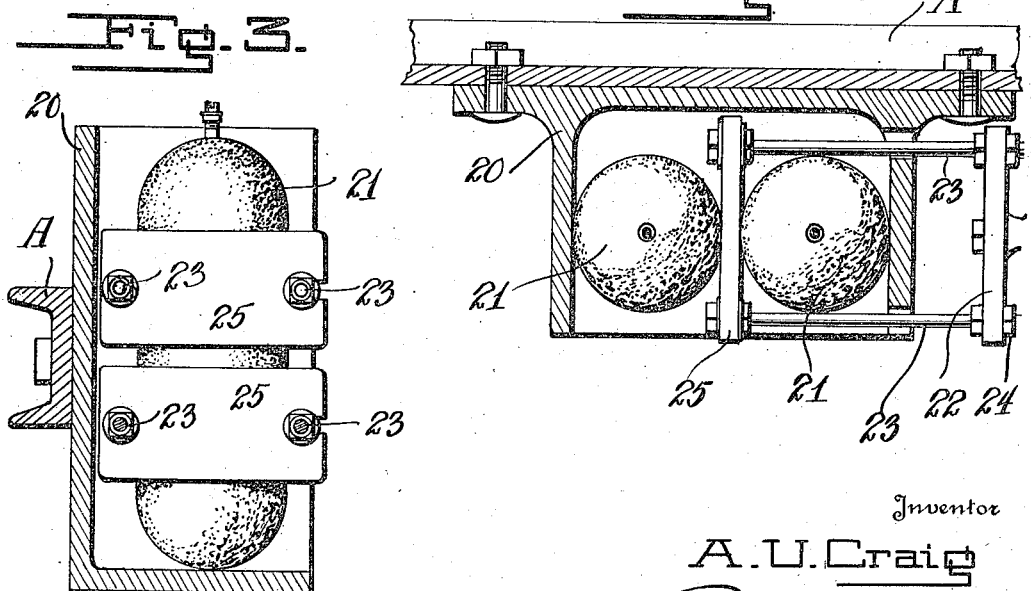
Inventor
A. U. Craig A. U. CRAIG.
CUSHION SUPPORT FOR VEHICLES.
APPLICATION FILED JAN. 22, 1917.
1,258,748.
Patented Mar. 12, 1918.
2 SHEETS—SHEET 2.
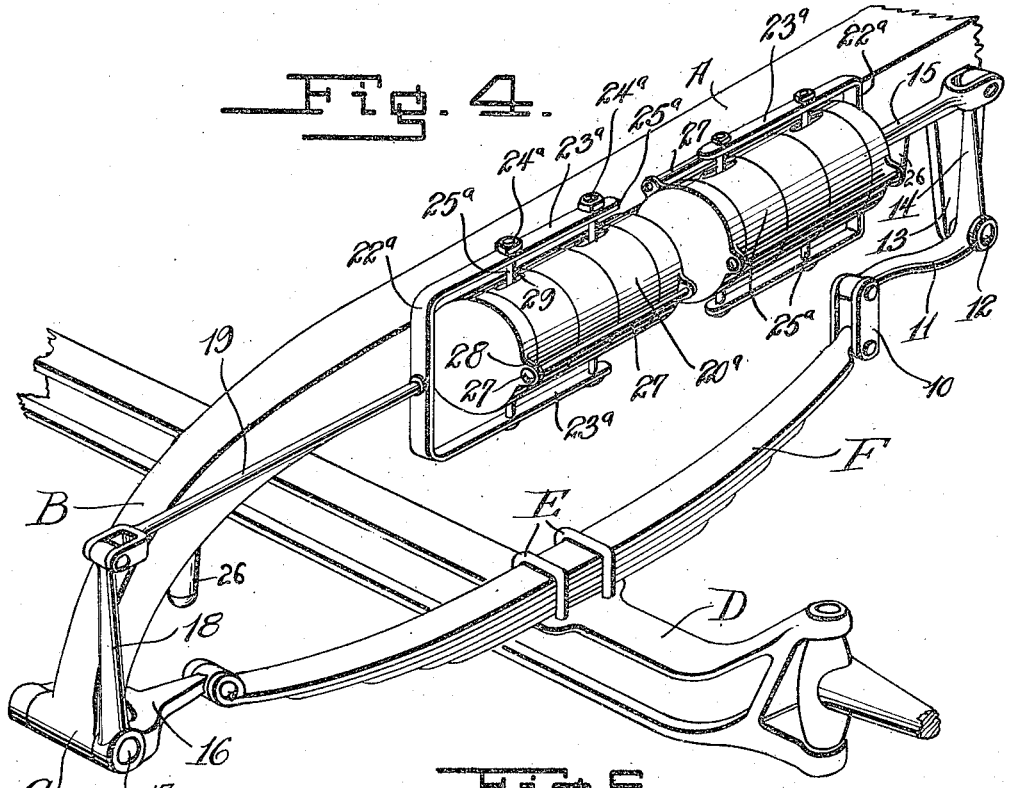
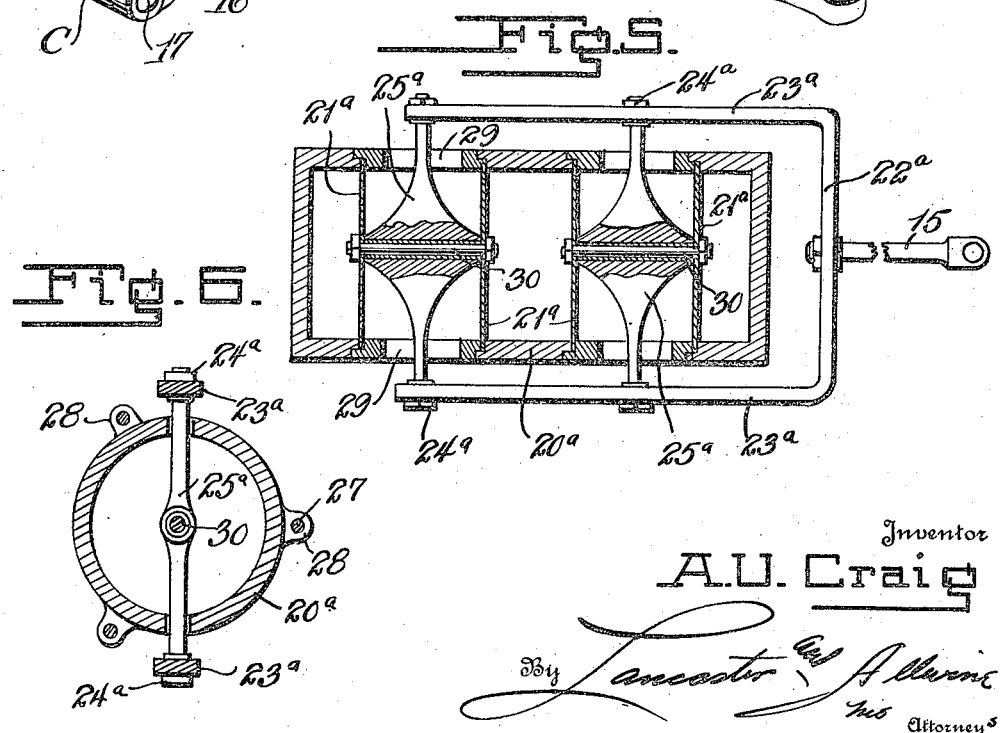
Inventor
A. U. Craig

UNITED STATES PATENT OFFICE.

ARTHUR U. CRAIG, OF WASHINGTON, DISTRICT OF COLUMBIA.

CUSHION-SUPPORT FOR VEHICLES.

1,258,748.   Specification of Letters Patent.   Patented Mar. 12, 1918.

Application filed January 22, 1917. Serial No. 143,822.

*To all whom it may concern:*

Be it known that I, ARTHUR U. CRAIG, a citizen of the United States, and a resident of Washington, in the District of Columbia, have invented a certain new and useful Improvement in Cushion-Supports for Vehicles, of which the following is a specification.

The present invention relates to a cushion support for vehicle bodies, and has for its prime object the provisions of means by the use of which the usual pneumatic tire, and its attendant disadvantages, may be entirely eliminated.

Another object of the present invention is to provide a resilient means which may be relatively small; which may be interposed between the axle and the vehicle body to cushion the wheel and the axle and prevent injury to the same; which is fully responsive in absorbing shocks of minor degree; and which is capable of withstanding and absorbing violent shocks or jars to which the carrier wheels and axles may be subjected.

The invention further aims at the provision of a resilient means having the above characteristics, and which is adapted to not only resiliently support the body, but which also checks the rebound incident to the absorption of shocks.

The above, and various other objects and advantages of this invention will be in part described, and in part understood from the following specific disclosure of the present preferred embodiments of this invention, the same being illustrated in the accompanying drawings wherein:

Figure 1 is a fragmentary perspective view of a frame bar and an axle of a vehicle, showing a connection between the same constructed according to the present invention.

Fig. 2 is an enlarged transverse sectional view taken through a cushion element constructed according to the present invention and employed between the frame bar and the axle.

Fig. 3 is a vertical section taken transversely through the cushion element.

Fig. 4 is a view similar to Fig. 1, disclosing a modified form of cushion element applied to the means of this invention.

Fig. 5 is a detail enlarged section taken longitudinally through the modified form of cushion element and the parts adjacent thereto.

Fig. 6 is a transverse section through the device of Fig. 5, showing one end of one of the connecting devices for coupling together the diaphragms in pairs.

Referring to these drawings, wherein like parts are designated by similar characters of reference throughout the several views, A designates the frame bar of a motor vehicle terminating at its end in a frame horn B in the usual manner, provided at its downturned extremity with a transversely opening eye-piece C. Beneath the frame bar A is transversely arranged an axle D, in the present instance a dead-axle being shown, which is secured by spring clips E to the intermediate portion of a multi-leaf semi-elliptic spring F, in the usual manner.

In lieu of the ordinary spring connections or shackles for connecting the ends of the spring to the side bar A and the horn B of the vehicle body, the inner end of the spring F, or the end remote from the horn B, is connected by means of a pair of relatively short vertically disposed links 10 with the extremity of a substantially horizontally disposed arm 11 of a bell-crank lever. The angle portion of the bell-crank lever is pivotally mounted upon a pin or stud 12 which projects outwardly from the lower end of a bracket plate 13 which depends from the side bar A of the vehicle body. The opposite arm 14 of the bell-crank lever extends upwardly from the stud 12 in a substantially vertical position, and is pivotally connected at its upper end to a connecting rod 15.

The forward or outer end of the spring F is in a substantially like manner connected to the horn B of the vehicle frame. The forward bell-crank lever has its horizontal arm in the form of a yoke 16 the ends of which engage against the opposite sides of the eye-piece C, and are pivotally connected thereto by means of a transversely extending pin or bolt 17. The free end of the arm or yoke 16 is pivotally connected to the forward end of the spring F.

To admit of the free flexing of the spring F and admit of the relative movement of the axle D with respect to the side bar A, the free ends of the arms 11 and 16 of the front and rear bell-crank levers terminate in spaced-apart relation a distance equal substantially to the distances between the upturned free ends of the springs F, and the links 10 which constitute the rear shackle for the spring, extend downwardly and are adapted to swing longitudinally with respect to the frame-bar A.

The opposite arm 18 of the forward bell-crank lever extends substantially vertically upward and is pivotally attached at its upper extremity to a forward connecting rod 19.

The connecting rods 15 and 19 preferably extend toward each other and longitudinally of the side bar A. The inner ends of the rods 15 and 19 are connected to a cushioning element which is preferably mounted on the side bar A, and which is adapted to retard the opposite swinging movement of the forward and rear bell-crank levers. As the arms 11 and 16 of the bell-crank levers are arranged substantially horizontally, the weight of the body is transmitted through the bell-crank levers to the rods 15 and 19, and consequently to the cushioning element.

In the form disclosed in Figs. 1, 2 and 3 of the drawings, the cushioning element is of the pneumatic type, while in the form shown in Figs. 4, 5 and 6, the cushioning element is of the metallic disk or diaphragm type.

In Figs. 1, 2 and 3, the frame bar A is provided, across its vertically extending flange, with an upright or vertical casing 20 which may be opened at its top and outer side. Arranged within the casing 20 are one or more flexible air-containers or bags 21, two being shown in the present instance, which are preferably elongated and arranged vertically in the casing 20. The inner free ends of the connecting rods 15 and 19 are provided with cross-heads 22 to which are adjustably connected a pair of spaced-apart yoke bars 23 which engage at their inner ends through apertures in the ends of the cross-heads 22, and which are provided with adjusting and locking nuts 24 for threaded engagement with the rods and for binding engagement against the opposite sides of the cross-heads.

The pairs of bars 23 are adapted for engagement through openings or recesses in the adjacent end walls of the casing 20, and for engagement against the opposite sides of the pneumatic members 21 which are located in the casing. Each pair of bars 23 is of sufficient length to extend past the adjacent air-container 21 only, and is provided upon its free end with a transversely extending buffer plate 25. The buffer plates 25 are arranged one above the other between the pneumatic elements 21, and the latter are of such size as to bind the buffer plates 25 therebetween. With this construction, any movement of the rods 15 and 19 draws the yoke rods 23 through the casing 20 and forces the buffer plates 25 against the adjacent sides of the pneumatic members 21. Thus, when the upper buffer plate 25 is drawn forwardly by the connecting rod 19, the forward pneumatic body will be compressed to resiliently retard the action of the connecting rod 19. If the same buffer plate 25 is moved rearwardly by connecting rod 19, the rearmost pneumatic element will be compressed and resist the movement of the connecting rod 19.

For the purpose of preventing injury to the spring F and the parts connected thereto, bumpers 26 are secured to the frame-bar A, and depend over and terminate short of the outer extremities of the horizontal arms 11 and 16 of the forward and rear bell-crank levers.

The form of resilient member disclosed in Figs. 4, 5 and 6, comprises one or more casings $20^a$ which are made up of a plurality of interfitting rings or annular sections held in interfitting relation by tie-rods 27. The tie-rods 27 are secured through radially extending lugs 28 which are formed upon the end or cap sections of the casing $20^a$ to hold the intermediate ring sections of the casing in interfitting relation. A resilient disk or diaphragm $21^a$ is engaged at its peripheral edge between the interfitting ends of each two adjacent casing sections. The interfitting of the sections holds the disks or diaphragms $21^a$ in position, and the diaphragms are preferably used in pairs, as shown in Fig. 5. The casing section, lying between each pair of diaphragms $21^a$, is provided at opposite sides with longitudinally extending slots or openings 29 adapted to receive therethrough the radiating arms of a buffer or connecting member $25^a$ which is fitted in the casing $20^a$ between each pair of resilient diaphragms. The buffer $25^a$ is elongated, axially of the casing $20^a$, and is adapted to fit snugly between each pair of the diaphragms $21^a$. The buffer 25 is also provided with an axial opening adapted to receive therethrough a connecting bolt 30 which extends beyond the opposite ends of the buffer $25^a$ and through the adjacent diaphragms $21^a$. Securing nuts or the like are mounted upon the opposite ends of the bolt 30 for binding the intermediate portions of the diaphragms to the buffing member $25^a$. From Fig. 5 of the drawings it will be noted that the radially extending arms of the buffer member $25^a$ are relatively thin and merge gradually into the central widened portions or hubs of the member. This construction permits of the free flexing of the diaphragms $21^a$ in either direction according to the movement of the buffer member.

In Fig. 4 of the drawings a pair of the resilient elements of the modified type are employed, one for each of the bell-crank levers. Each casing $20^a$ is provided with a pair of buffing members $25^a$, and each of the latter is provided with a pair of diaphragms 21ª. The resilient members employed in the casing 20ª are in the form of diaphragms or disks, preferably because the same are responsive to relatively slight shocks or vibrations which may be transmitted to them through the buffing members 25ª. By arranging the diaphragms in pairs, and providing two pairs thereof for each of the bell-crank levers, sufficient strength and rigidity is given to the structure to sustain the bell-crank levers in position and to absorb violent shocks or strains to which the carrier wheels and the axle may be subjected.

In the modified form, the connecting rods 15 and 19 are provided upon their inner free ends with cross-heads 22ª, having their opposite ends turned at substantially right angles in spaced and substantially parallel relation to the opposite sides of the casing 20ª, and secured to the outer ends of the radiating arms of the buffer members 25ª. The extremities of said arms are preferably rounded and extended through openings in the ends 23ª of the cross-heads, and nuts 24ª, or the like, secure the buffer members 25ª to the cross-head arms.

In both forms of the invention the bell-crank levers are held yieldingly from movement in either direction, and the cushioning element may be mounted upon the frame-bar A, and is relatively small and compact in form, the bell-crank and other connecting means transmitting the vibrations and shocks to the resilient members.

Either form of the cushioning elements holds the bell-crank levers from movement, yieldingly, in either direction so that the axle D is yieldingly supported beneath the frame bar A, and the members A and D are held not only from movement toward each other, but also from separation or recoil incident to shocks which may be impacted against axle D.

It is of course understood that various other changes and modifications, than above, may be made without departing from the spirit of this invention, and that they are restricted only by the scope of the following claims.

I claim:—

1. In a vehicle, the combination with a body member, an axle member, and a spring carried by said axle member, of spring shackles connecting the opposite ends of said spring to said body member, and a single cushion element carried by said body member and having connection with both of said shackles whereby to retard the opposite movements of said shackles to absorb shock and rebound.

2. In a vehicle, the combination with a body member, an axle member, and a spring carried by said axle member, of a pair of bell-crank levers pivotally mounted on said body member and having hinged connection at one end with the opposite ends of said spring, connecting rods pivotally engaging the opposite ends of said bell-crank levers, and cushion elements mounted on the body member and connected to the free extremities of said connecting rods in such manner as to retard the opposite movements of said bell-crank levers.

3. In a vehicle, the combination with a body member, an axle member, and a connecting member carried by the axle member, of a pair of bell-crank levers pivotally mounted at their angle portions on said body member and having connection at one end with the free ends of said connecting member, and cushion elements connected to the opposite ends of said bell-crank levers for retarding the movements thereof.

4. In a vehicle, the combination with a side frame bar having the usual frame horn, an axle arranged beneath the frame bar, and a spring secured at its intermediate portion across said axle, of a bell-crank lever pivotally mounted on said horn and having engagement with the adjacent end of said spring, a second bell-crank lever pivotally mounted on said frame bar and having hinged connection with the adjacent end of said spring, a connecting rod extending inwardly from the opposite end of each bell-crank lever, and a cushioning element connected to the inner end of each connecting rod.

5. In a vehicle, the combination of a frame bar provided with the usual horn, a bell-crank lever hingedly supported on said horn, a second-bell crank lever pivotally supported upon the frame bar, said bell-crank levers being connected at one end with the extremities of a semi-elliptic spring of the vehicle body, said ends of the bell-crank levers being arranged to extend substantially horizontally, and the opposite ends of said bell-crank levers extending substantially vertically upward, connecting rods pivotally mounted upon the upwardly extending ends of said bell-crank levers, and a cushioning member connected to the inner ends of said connecting rods to retard the movement of the same.

6. In a vehicle, the combination with a body member, an axle arranged beneath said member, and a semi-elliptic spring secured across said axle, of a pair of bell-crank levers pivotally mounted on said body member and having substantially horizontal arms pivotally connected to the extremities of said spring, connecting rods secured to the opposite ends of said bell-crank levers, and a pneumatic cushioning element connected to the inner ends of said connecting rods for retarding the movement of the same.

7. In a vehicle, the combination with a body member, an axle arranged beneath said member, and a spring secured across said axle, of a pair of bell-crank levers pivotally mounted on said body member and having connection at one end with the opposite ends of said spring, a pair of inwardly extending connecting rods hinged upon the opposite ends of said bell-crank levers, a casing mounted on said body member, a pair of spaced-apart pneumatic members mounted in said casing, a pair of independent buffing plates arranged between said pneumatic members, and connections between said buffing plates and the adjacent extremities of the connecting rods.

8. In a vehicle, the combination with a body member and an axle arranged beneath the body member, of a bell-crank lever pivotally mounted on the body member and having connection with said axle, a connecting rod pivotally mounted on said bell-crank lever, and a pneumatic cushion element mounted on said body member and having connection with the opposite end of said connecting rod to retard the movement of the same in a direction to support the body member on the axle.

9. In a vehicle, the combination with a body member, and an axle arranged beneath the body member, of a pair of spaced-apart bell-crank levers pivotally mounted on said body member and having connection at one end with said axle, a pair of connecting rods pivotally mounted on the opposite end of said bell-crank levers and extending inwardly toward each other, a casing arranged upon said body member, a pair of spaced-apart pneumatic members mounted in said casing, a pair of buffer plates arranged between said members and adapted to be engaged at their opposite sides thereby, and means on the end of each connecting rod for engagement with one of the buffer plates whereby movement of the connecting rods presses the buffing plates against the opposite pneumatic members to resist the motion of the connecting rods in either direction.

ARTHUR U. CRAIG.

Copies of this patent may be obtained for five cents each, by addressing the "Commissioner of Patents, Washington, D. C."